United States Patent
Johnson

(10) Patent No.: US 10,906,716 B2
(45) Date of Patent: Feb. 2, 2021

(54) SPOUT-CONNECTOR ASSEMBLY FOR FLUID DISPENSING FROM FLEXIBLE BAGS

(71) Applicant: Liqui-Box Corporation, Richmond, VA (US)

(72) Inventor: James W. Johnson, Delaware, OH (US)

(73) Assignee: Liqui-Box Corporation, Richmond, VA (US)

( * ) Notice: Subject to any disclaimer, the term of this patent is extended or adjusted under 35 U.S.C. 154(b) by 0 days.

(21) Appl. No.: 16/866,667

(22) Filed: May 5, 2020

(65) Prior Publication Data

US 2020/0262633 A1  Aug. 20, 2020

Related U.S. Application Data

(62) Division of application No. 15/341,591, filed on Nov. 2, 2016, now Pat. No. 10,759,583.

(60) Provisional application No. 62/249,657, filed on Nov. 2, 2015.

(51) Int. Cl.
   *B65D 75/58*  (2006.01)
   *B65D 25/48*  (2006.01)
   *F16L 41/16*  (2006.01)

(52) U.S. Cl.
   CPC ......... *B65D 75/5877* (2013.01); *B65D 25/48* (2013.01); *F16L 41/16* (2013.01)

(58) Field of Classification Search
   CPC ...... B65D 75/5877; B65D 25/48; F16L 41/16
   USPC ........................................................ 141/349
   See application file for complete search history.

(56) References Cited

U.S. PATENT DOCUMENTS

| 4,378,069 | A |   | 3/1983  | Franco |              |
|-----------|---|---|---------|--------|--------------|
| 4,421,146 | A | ‡ | 12/1983 | Bond   | B65D 77/06   |
|           |   |   |         |        | 141/34       |
| 4,445,551 | A | ‡ | 5/1984  | Bond   | B65D 77/06   |
|           |   |   |         |        | 141/34       |
| 5,031,662 | A | ‡ | 7/1991  | Roethel| F16L 29/04   |
|           |   |   |         |        | 137/61       |
| 5,095,962 | A | ‡ | 3/1992  | Lloyd-Davies | B67D 3/045 |
|           |   |   |         |        | 141/11       |
| 5,680,970 | A | ‡ | 10/1997 | Smith  | B65D 47/248  |
|           |   |   |         |        | 222/51       |
| 5,697,410 | A | ‡ | 12/1997 | Rutter | F16L 37/32   |
|           |   |   |         |        | 137/61       |
| 5,901,761 | A | ‡ | 5/1999  | Rutter | F16L 37/32   |
|           |   |   |         |        | 137/61       |
| 5,983,964 | A | ‡ | 11/1999 | Zielinksi | F16L 29/00 |
|           |   |   |         |        | 137/61       |

(Continued)

FOREIGN PATENT DOCUMENTS

WO      2004085283        10/2004
WO    WO2004085283 A1 ‡ 10/2004

*Primary Examiner* — Timothy L Maust
*Assistant Examiner* — James R Hakomaki
(74) *Attorney, Agent, or Firm* — McAndrews, Held & Malloy, Ltd.

(57) ABSTRACT

The present invention relates to a universal fitment, method of assembling the universal fitment, and method of dispensing liquids using such universal fitment. The universal fitment of the present invention has features to engage a quick-connect-disconnect dispensing connector or a screw-on connector dispensing connector for the dispensing of liquids and semi-liquids from a collapsible bag.

17 Claims, 15 Drawing Sheets

UNCAP FROM PRE-CAP POSITION
( READY TO FILL BAG )

FULL-CAP POSITION
READY TO ENGAGE CONNECTOR
( WITH SCREW ON CONNECTOR )

(56) References Cited

U.S. PATENT DOCUMENTS

| | | | |
|---|---|---|---|
| 6,347,785 B1 ‡ | 2/2002 | Copp | B67D 1/0835 |
| | | | 251/14 |
| 6,612,545 B1 | 9/2003 | Rutter et al. | |
| 6,637,725 B2 | 10/2003 | Davis et al. | |
| 6,779,556 B2 ‡ | 8/2004 | Roethel | F16L 29/04 |
| | | | 137/61 |
| 6,953,070 B1 ‡ | 10/2005 | Labinski | B67D 3/02 |
| | | | 137/61 |
| 8,479,785 B2 | 7/2013 | Johnson | |
| 8,511,639 B2 | 8/2013 | Johnson | |
| 8,578,979 B2 | 11/2013 | Johnson | |
| 2012/0279986 A1 ‡ | 11/2012 | Johnson | F16L 29/02 |
| | | | 222/1 |

‡ imported from a related application

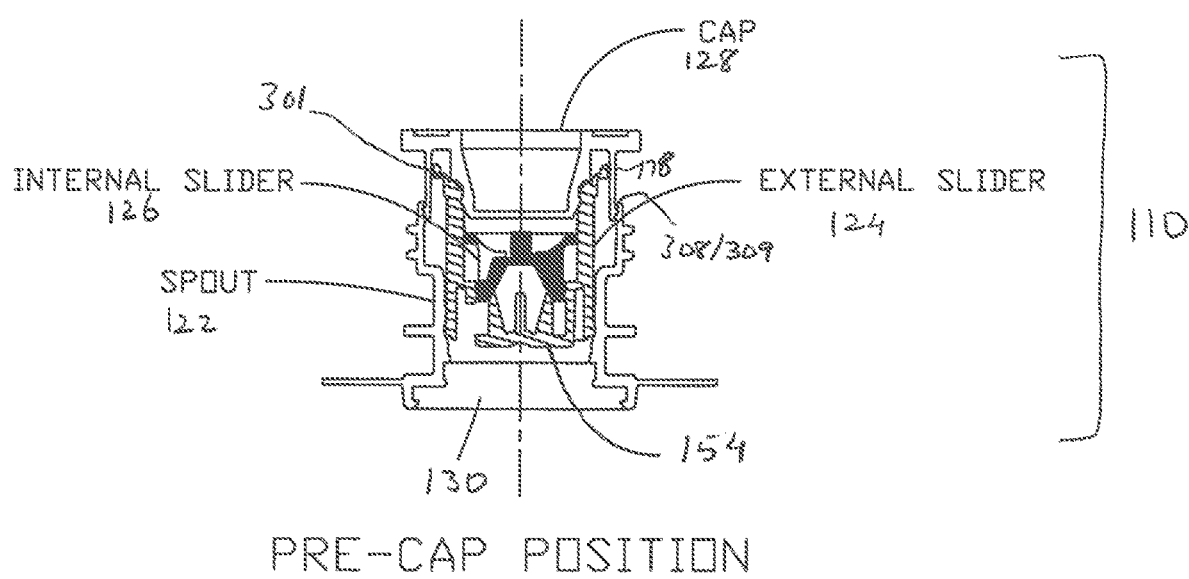
FIG. #1

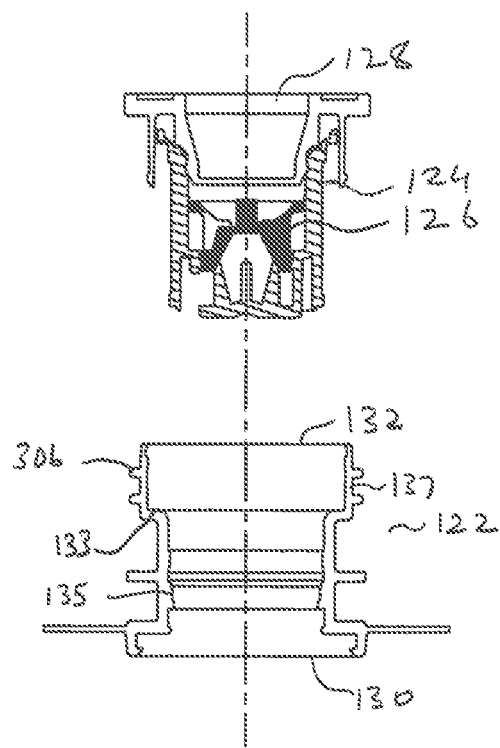
FIG. #2

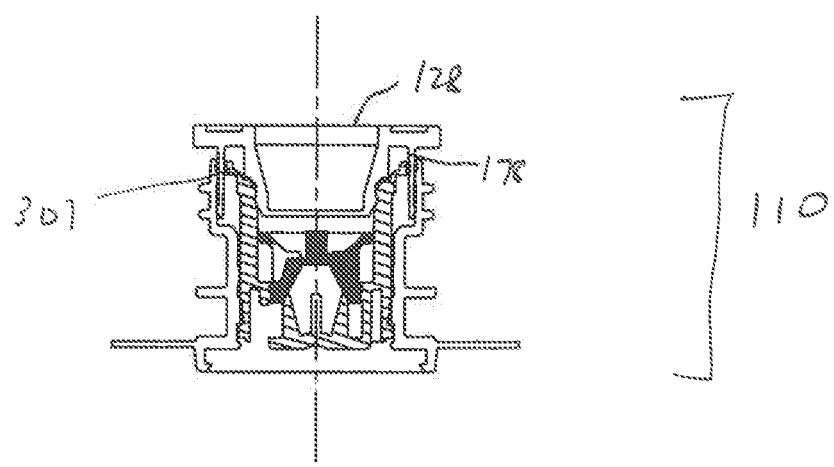
FULL-CAP POSITION
FIG. #3

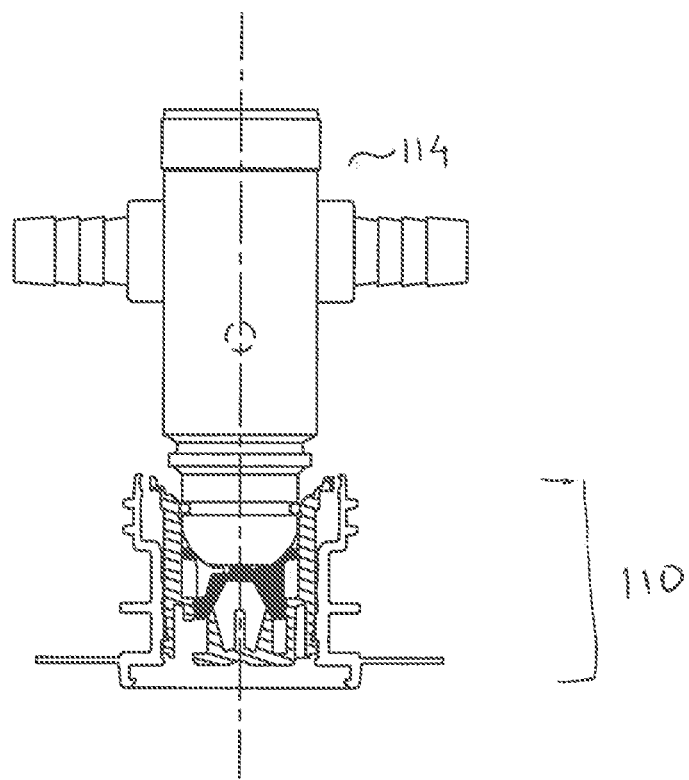
FIG. #4

FIRST POINT OF FLUID FLOW
EXTERNAL SLIDER THEN MOVES DOWN
INTO DISPENSE LOCK POSITION
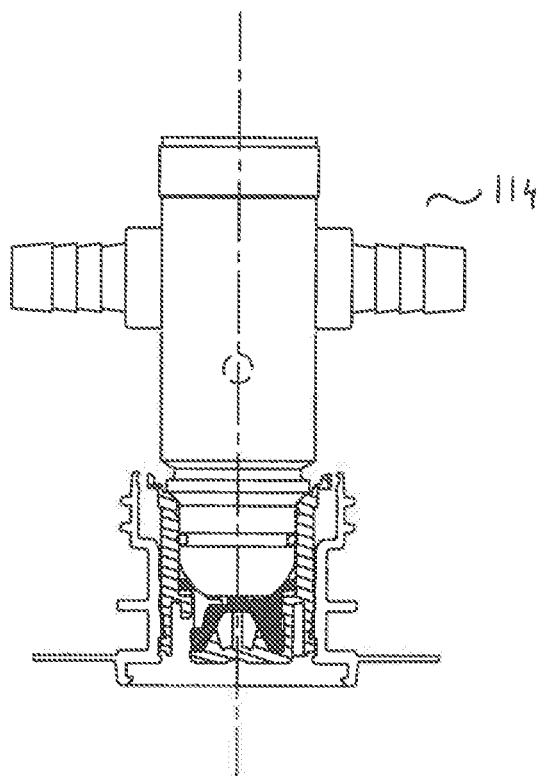
FIG. #5

DISPENSE POSITION
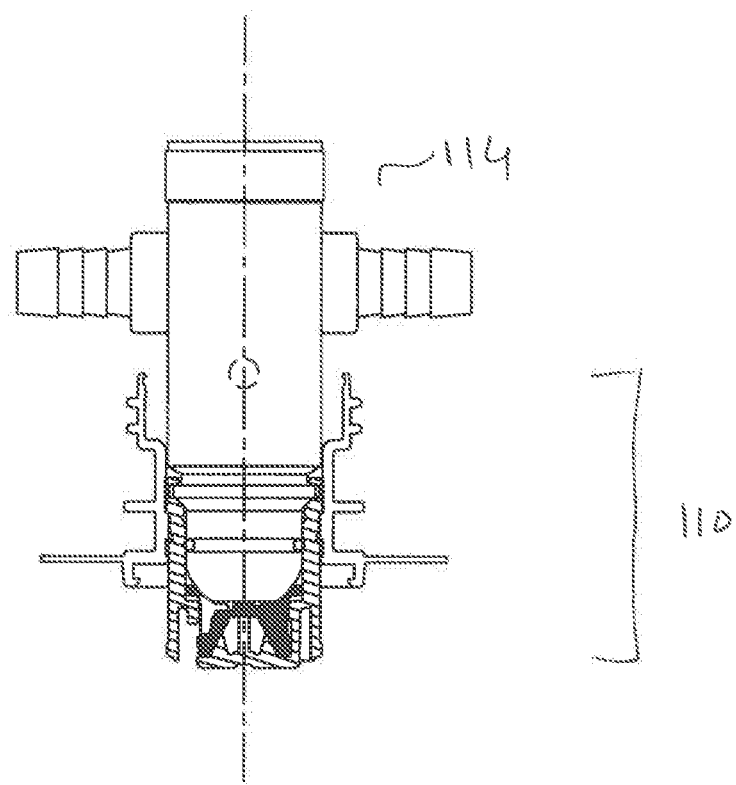
FIG. #6

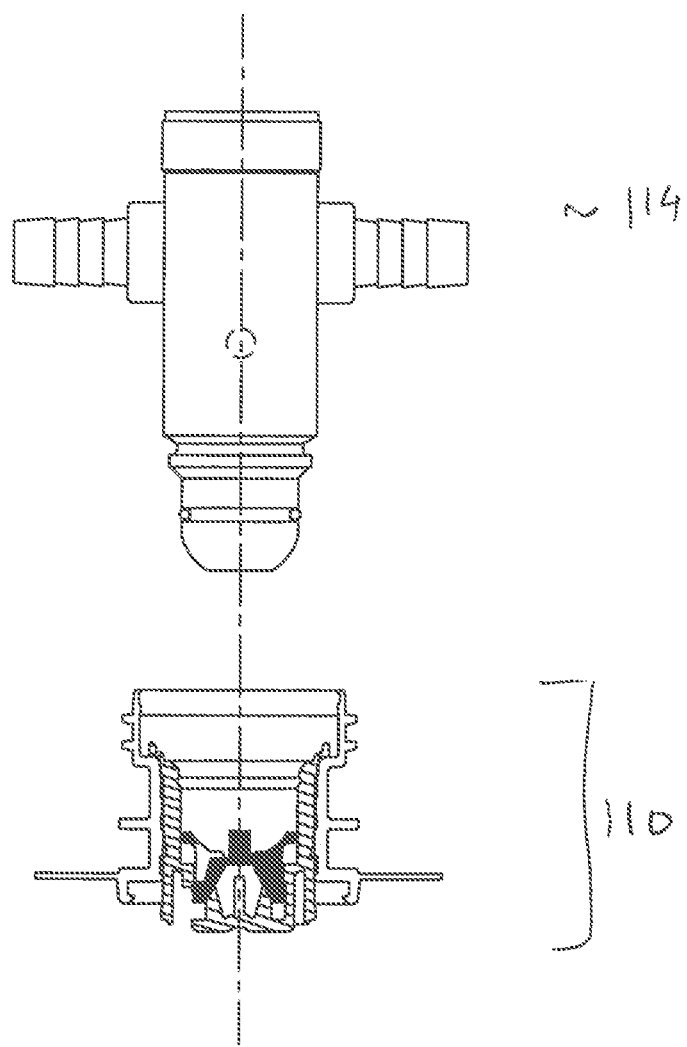
FIG. #7

DIS-ENGAGE POSITION
READY TO RE-ENGAGE CONNECTOR
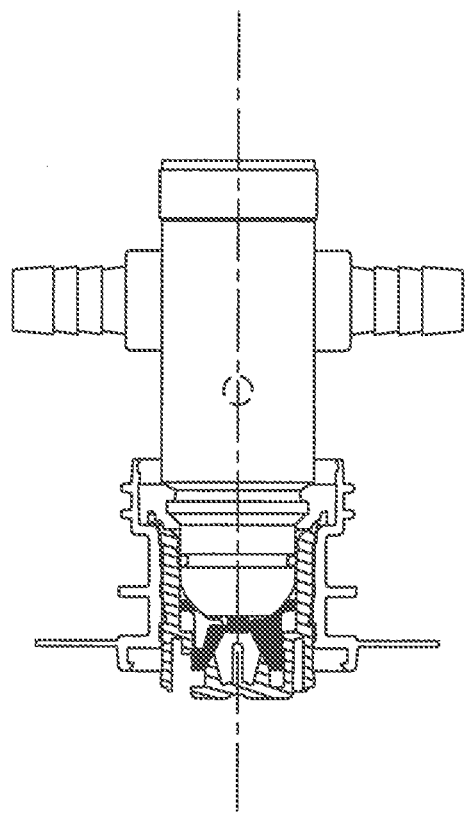
FIG. #8

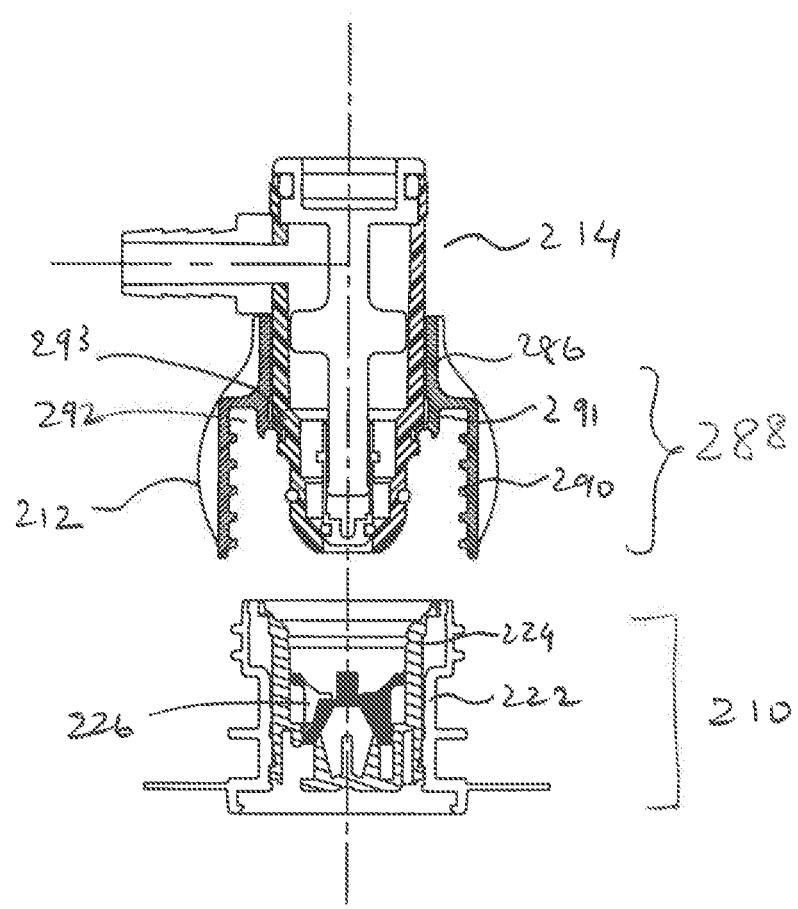

DISPENSE POSITION
( WITH SCREW ON CONNECTOR )
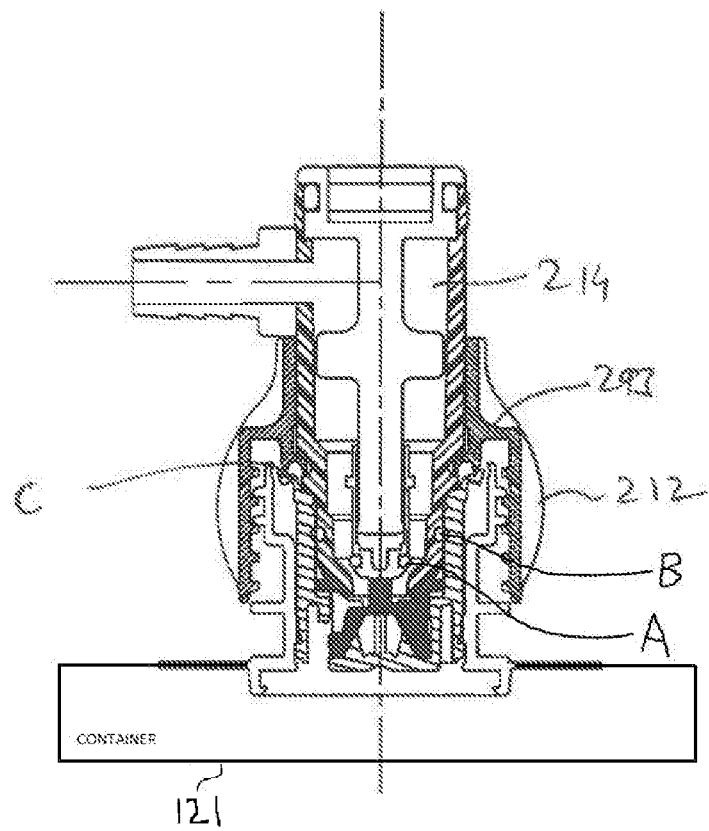
FIG. #10

SPOUT-CONNECTOR ASSEMBLY FOR FLUID DISPENSING FROM FLEXIBLE BAGS

CROSS REFERENCE TO RELATED APPLICATIONS

This application is a divisional of U.S. patent application Ser. No. 15/341,591, filed Nov. 2, 2016, which claims the benefit of U.S. Provisional Application No. 62/249,657, filed Nov. 2, 2015, the contents of which are incorporated herein by reference.

TECHNICAL FIELD

The present invention relates to a universal fitment, method of assembling the universal fitment, and method of dispensing liquids using such universal fitment. The universal fitment of the present invention has features to engage a quick-connect-disconnect dispensing connector or a screw-on connector dispensing connector for the dispensing of liquids and semi-liquids from a collapsible bag.

BACKGROUND

Many systems are used for dispensing beverage syrup from a disposable package consisting of a flexible collapsible bag in a corrugated box commonly referred to as a bag-in-box dispensing package.

Generally these systems include a bag that is provided with a fitment in the form of a spout through which filling and dispensing occurs. It is generally desirable to provide a quick-disconnect coupling between the spout and the service line of the pump or other type of beverage mixing and dispensing system. Such a coupling may be carried on the spout fitment of the bag and will work in conjunction with the service line connector or "probe", and is commonly called in the art a single-service valve and coupling since it is discarded with the bag when it is emptied. This type of valve opens automatically as the line connector is connected to the spout and closes as it is disconnected therefrom to prevent syrup from draining from the bag.

Quick-connect valve systems and slider fitments for fluid dispensing are known. Certain fitments having valves having more than one moveable component are also known.

Some systems are dedicated to only one type of currently known service line connection; while others are adapted to be used with various types of service line connectors.

U.S. Pat. No. 4,445,551 (Bond, et al.) teaches a cylindrical tubular valve member having a closed lower end positioned within a spout. Gripping lugs on the valve member are adapted to grip the dispensing connector. For dispensing, the dispensing connector pushes the valve member inwardly so that outlets on the side thereof are open to fluid flow. A seal is produced between the O-ring on the dispensing connector and the valve body. In Bond et al., a connector is disclosed that slides into a slidable valve contained within a spout. The slidable valve has fingers that fit into the connector, so that sliding the connector into the spout causes the slidable valve to grip the connector and slide into a position in the spout where the slidable valve is opened. The alignment of the connector with the slider valve is crucial to the operation of this invention, and somewhat problematic with this configuration.

U.S. Pat. No. 4,421,146 (Bond and Ulm) teaches a dispensing valve assembly for coupling to a service line connector. The valve member has gripping members that cooperate with the dispensing connector to move the valve between a closed and open position. The dispensing connector also has a collar for gripping the spout. An O-ring on the dispensing connector provides a seal with the valve.

U.S. Pat. No. 6,347,785 (Copp, et al.) discloses a universal quick-disconnect coupling and valve. The fitment includes a generally cylindrical spout for attachment to a container that is capable of mating with a dispensing connector. A slider moves axially within the spout and has a valve within it that moves from a closed position to an open position upon insertion of a dispensing connector into the slider. An external support member and clamp about the dispensing connector has teeth to engage the flange of an external adapter ring of the spout. The dispensing connector is sealed within the slider by an O-ring which cooperates with an internal adapter sleeve that fits within the slider.

U.S. Pat. No. 5,031,662 (Roethel #1), U.S. Pat. No. 6,779,556 (Roethel #2) and U.S. Pat. No. 6,953,070 (Labinski, et al.) teach a dispensing fitment having a first body secured to a liquid container and forming a first flow passage and a valve assembly connected to this secured body, which has a seal retaining body defining a second flow passage that communicates with an inlet of the first flow passage. A resilient seal member located in the second flow passage is resiliently urged into sealing engagement with the inlet to block fluid flow from the second flow passage into the first flow passage. The assembly further includes a spout that is slideable within the first body to an inward position where the seal member is moved resiliently away from the inlet to allow fluid flow between the passages. The seal retaining body is a resilient tubular member transverse to the first flow passage and is made of a resilient (i.e. rubber) material. A dispensing connector collar has grooves for engaging flanges on the first body. The dispensing connector includes O-rings for sealingly engaging the valve assembly.

U.S. Pat. No. 5,983,964 (Zielinksi, et al.) teaches a dispensing apparatus for coupling between a dispensing connector and the spout of a container so as to permit coupling of a valve sub-assembly housed in the dispensing connector with a single slider valve assembly housed in the spout. The apparatus includes a collar about the dispensing connector and includes sleeves having at least two resilient fingers members. Each finger member has a surface engageable with a flange portion on the outer surface of the spout. A collar is releasably slid over an outer surface of the sleeve for constricting the resilient finger members toward a lower end of the sleeve. The fingers act to lock the collar relative to the spout. The system provides a single-handed coupling operation for the collar and spout. An O-ring on the probe forms the seal with the valve assembly and an inner O-ring connects with the valve sub-assembly. The collar does not engage the valve assembly housed in the spout. Zielinksi discloses a valve subassembly for connecting to a line and a mating spout that contains a mechanism for actuating the valve subassembly. In that patent, the valve subassembly is described for use in conjunction with an axially engaged connector and was designed for compatibility with existing bag-in-box connectors.

U.S. Pat. No. 5,095,962 (Lloyd-Davies, et al.) teaches a fluid dispensing device comprising a valve member slideable in the spout of a container. The single valve member is tubular and has an open outer end for receiving a dispensing connector and a closed inner end. The valve member has openings through its sidewalls. In the closed position of the valve member, opposed shoulders of the valve member and of the spout resist axial movement of the valve member in either direction and interengaged sealing surfaces block fluid flow to the openings. The outer end portion of the valve member is laterally outwardly deflectable and includes protrusions adapted to enter the recess of a dispensing connector and engage the dispensing connector whereby the valve member can be moved between the open and closed position. In the dispense position, an O-ring provides a seal between the outside of the dispensing connector and the inner wall of the valve member. Lloyd-Davies discloses a connector valve that has a nut rotatably connected to it, the mating and valve actuating occurring when the spout and nut threads are engaged. The incorporation of threaded spouts presents a problem in achieving compatibility between different bag-in-box connector systems. The use of a complete thread form also can require multiple turns for making a connection and involves using longer spout. These are disadvantages for systems located in small spaces since more room is required to operate the spout and it may also be difficult to load or remove the boxes.

U.S. Pat. No. 5,697,410 (Rutter et al. #1) and U.S. Pat. No. 5,901,761 (Rutter, et al. #2) teach a spout fitment for a liquid container. The fitment includes a dispensing valve member slideable within the spout of the container. A valve element within the slideable dispensing valve member is resiliently biased to close a fluid flow opening therein. The valve element sits on the inside of a wall extending across the slideable dispensing valve member and a resilient member is required to push the valve element against the inner surface of this wall. Given this arrangement, a snap fit of parts is not possible. In the dispensing position, an O-ring on the dispensing connector forms a seal with the slideable dispensing valve member. The member may also include a ridge for engaging the O-ring and snapping into an associated groove on the dispensing connector. In some embodiments, a ridge on a dispensing connector shown can apparently press down on the top edge of the slideable dispensing valve member.

The ITW New Zealand Corporation produces a screw on connector comprising a line connector and spout assembly (part number 390-0267) that incorporates partial threads on the spout for connecting with a threaded line connector. The ITW connector incorporates two rigid partial threads on the spout for mating with a threaded line connector, thus allowing for some amount of compatibility. The ITW connector further has a self-locking feature that incorporates a notch on the spout and a mating piece on the line connector that fits into the notch to form a detent. As with the Lloyd-Davies connector, placing a rigid thread on the spout provides compatibility with other connectors difficult.

U.S. Pat. No. 5,680,970 (Smith and Tschanen) teach a self-closing dispensing valve comprising a valve housing having a fluid conduit with a valve orifice therethrough and a flow control member within the valve body. The flow control member is displaceable between a closed and open position. A plurality of resilient flexible fingers are fixed to either the valve housing or the valve member and are deflected when the valve member is displaced to its open position. The fingers are deflected by a conical camming surface on the valve member when displaced toward the open position.

International Patent Application Publication No. WO 2004/085283 (Johnson) teaches a double slider valve fitment for attachment to a container for fluid. The fitment includes a spout having an external surface capable of mating with a collar of a dispensing connector. An external slider is movable axially within the spout and an internal slider is movable axially within the external slider. The internal slider is movable between a closed position that prevents the flow of fluid through the fitment and an open position that allows for the flow of fluid through the fitment. The internal slider is adapted to be moved between the closed and open positions by insertion of the dispensing connector into the external slider. The internal slider is biased toward the closed position when the dispensing connector is released as a result of temporary deformation of portions of the external slider by the internal slider pressed inwardly by the dispensing connector. The internal slider cooperates with the dispensing connector by means of locking lugs on a top edge thereof. A dispensing connector collar is disclosed, which may be threaded for threaded engagement with an external surface of the spout. In the dispensing position, O-rings on the dispensing connector sealingly engage with the external and internal slider.

Johnson represents a significant improvement in the art. In particular, due to the arrangement of parts, a component that has a significant inherent resilience (i.e. rubber or a spring) is not required; rather the entire fitment is preferably formed of plastic. Further, the relatively simple arrangement of parts facilitates both manufacture of the individual valve components and the assembly of the fitment. There nevertheless remains room in the art for improvement. For example, in the dispensing position, sealing engagement between the dispensing connector and fitment is provided by the O-ring on the dispensing connector.

Known fitments generally seal as a result of rubber O-rings positioned on the probe. This arrangement of parts, even where another sealing position is used, can suffer from leakage and failure.

Where a collar is used, the fitments of the prior art generally engage with a dispensing connector via a gripping collar on the outside of the spout. Typically, the dispensing connector could comprise a collar adapted for threadable engagement with a flanged or threaded outside surface of the spout. The collar is typically adapted to work with certain spouts.

Known fitments further have a tendency for the collar and probe to become inadvertently disengaged, which is very inconvenient to the user.

The present invention provides a fitment that is functionally compatible with the quick connect-disconnect connector or the screw-on connector. This eliminates the need to have different dispensing connectors for different packaging fitments.

SUMMARY

Accordingly, in one of its aspects, this invention relates to a process for dispensing fluid to or from a container using a dispensing connector that is either a QCD connector or a screw-on connector, said process comprising:

(I) providing said container comprising said fluid, with a fitment attached to said container, wherein said fitment is capable of accepting a dispensing connector that is part of a dispensing apparatus, wherein said dispensing connector connects the supply of said fluid to said dispensing apparatus, wherein said dispensing connector is either the QCD connector or the screw-on connector;

(II) inserting said dispensing connector into said fitment to actuate an internal valve body within said fitment; and (III) dispensing said fluid from said container through said dispensing apparatus; wherein said fitment assembly comprises said fitment attached to said container for holding and dispensing said fluid, said fitment comprising:

(i) a generally cylindrical spout attached thereto, wherein said spout comprises a base portion attachable to said container and a top portion suitable for receiving a dispensing connector, wherein said spout has sufficient number of threads on the outer surface at the top portion for engagement with a dispensing connector if the dispensing connector is a screw-on connector;

(ii) a generally cylindrical external valve body movable to a fixed position within the spout, said external valve body comprising a top end and a bottom end, wherein said external valve body has a plurality of circumferentially located flexible tabs at the top end of said external valve body, wherein said top end engages a dispensing connector;

(iii) a generally cylindrical internal valve body movable axially within the external valve body, the internal valve body movable between a closed position operable to prevent the flow of fluid through the fitment and an open position operable to allow the flow of fluid through the fitment, the internal valve body movable between closed and open positions by insertion of a dispensing connector into the external valve body adjacent the internal valve body, the internal valve body being biased toward the closed position; and (iv) optionally, a cap, said cap comprising an outer skirt and an internal cylinder, wherein said cap in a precap position closes the spout such that the distal end of the outer skirt at its outer surface engages the top rim of the spout and the flexible tabs on the external valve body fit snugly in the space between said outer skirt and said inner cylinder to provide attachment of the cap to said fitment;

wherein if the dispensing connector is a QCD connector, then said QCD connector engages with the said fitment through said external valve body; and wherein if the dispensing connector is a screw-on connector, then said fitment assembly further comprising, optionally, a collar for attachment to the dispensing connector and for releasable coupling to the fitment, wherein when coupled to the fitment the collar compressively engages the external valve body to form a seal between the external valve body and the dispensing connector wherein said collar comprises a generally cylindrical collar body for engagement about said dispensing connector and a fitment end for coupling to said fitment; wherein said collar comprises a compression flange connected to the collar body at said fitment end for engaging and compressing said plurality of flexible tabs located on the top rim of said external valved body at said top end of said external valve body; wherein the fitment end comprises an external descending flange and an internal descending flange connected to said base of said collar body, said external descending flange and said internal descending flange being concentric and spaced from each other; and wherein said fitment assembly is made from a synthetic resin material.

In one aspect, this invention relates to previous process, wherein the dispensing connector is a screw-on connector and said internal wall of the external descending flange is threaded for engagement with an external threaded surface of said spout.

In yet another aspect, this invention relates to previous processes, wherein the dispensing connector is a screw-on connector and the external descending flange and internal descending flange are spaced from each other so as to form a receiving space and a portion of the spout is receivable in the receiving space without active engagement of the exterior of the spout.

In one embodiment of the present invention, in the above described processes, the receiving space has smooth walls.

In another embodiment, this invention relates to the above processes wherein the dispensing connector is a screw-on connector, and wherein the external descending flange extends about the entire periphery of the collar body.

In yet another embodiment, the invention relates to above described processes, wherein the compression flange is connected to an internal surface of the internal descending flange for engaging and compressing the flexible tabs at the top rim of the external slider.

In one embodiment, the present invention relates to above described processes, wherein the external valve body comprises a generally cylindrical body and a valve seat attached to an end thereof by a plurality of radially spaced posts defining apertures therebetween, the posts being spaced from the spout to allow liquid to flow therethrough when the valve is in the open position.

In one aspect, the present invention relates to the above described processes, wherein the internal valve body comprises a body having a plurality of ports therein that allow fluid flow therethrough when the valve is in the open position.

In another aspect, this invention relates to the above described processes, wherein the valve seat further comprises a plurality of spaced projections that extend from the valve seat toward the exterior of the container.

This invention also relates to the processes described above, wherein in the open position, the dispensing connector compresses the internal valve body such that the internal valve body forces the projections to assume a biased position, the projections returning the internal valve body to a closed position when the dispensing connector is removed.

This invention further relates to processes described above wherein said dispensing connector is a screw-on connector with a collar and wherein said dispensing connector collar comprising a collar body for engagement about said dispensing connector, said dispensing connector collar body having a fitment end mateable with said fitment so as to compress said top of the external valve body against said dispensing connector to form a seal; wherein said collar comprises a generally cylindrical collar body for engagement about said dispensing connector and a fitment end for coupling to said fitment; wherein said collar comprises a compression flange connected to the collar body at said fitment end for engaging and compressing a top edge of said external valve body; and wherein the fitment end comprises an external descending flange and an internal descending flange connected to said base of said collar body, said external descending flange and said internal descending flange being concentric and spaced from each other.

This invention further relates to processes described above, wherein said dispensing connector is a screw-on connector, with a connector collar and wherein said connector collar engages a valved fitment for a container for holding and dispensing fluid; wherein said collar body having a fitment end mateable with the fitment so as to compress the plurality of flexible tabs located on the top rim of the external slider valve so as to form a seal between the external slider valve and the dispensing connector; wherein the compression flange engages the flexible tabs at the top rim of the external slider valve wherein compression in a downward direction causes a seal between the inner edge of the slideable component and an inner lip of the compression flange; wherein the compression flange engages the top rim of the spout wherein compression in a downward direction causes a seal between the inner edge of the spout and an inner lip of the compression flange; wherein said fitment-attached to said container for holding and dispensing said fluid and having a generally cylindrical spout attached thereto, said fitment comprising a generally cylindrical external valve body movable to a fixed position within said spout; and a generally cylindrical said internal valve body movable axially within said external valve body, said internal valve body movable between a closed position operable to prevent the flow of said fluid through said fitment and an open position operable to allow the flow of said fluid through said fitment, said internal valve body movable between closed and open positions by insertion of said dispensing connector into said external valve body adjacent said internal valve body, said internal valve body being biased toward said closed position; and a collar for attachment to said dispensing connector and for releasable coupling to said fitment, wherein when coupled to said fitment said collar compressively engages said external valve body to form a seal between said external valve body and said dispensing connector; wherein said collar comprises a generally cylindrical collar body for engagement about said dispensing connector and a fitment end for coupling to said fitment; wherein said collar comprises a compression flange connected to the collar body at said fitment end for engaging and compressing the flexible tabs of said external valve body; wherein the fitment end comprises an external descending flange and an internal descending flange connected to said base of said collar body, said external descending flange and said internal descending flange being concentric and spaced from each other; and wherein said fitment is made from a synthetic resin material.

This invention also relates to a fitment assembly for use with a quick-connect-disconnect dispensing connector or a screw-on connector, comprising: a fitment for attachment to a container for holding and dispensing a fluid, said fitment comprising:
  (i) a generally cylindrical spout attached thereto, wherein said spout comprises a base portion attachable to said container and a top portion suitable for receiving a dispensing connector, wherein said spout has sufficient number of threads on the outer surface at the top portion for engagement with a dispensing connector if the dispensing connector is a screw-on connector;
  (ii) a generally cylindrical external valve body movable to a fixed position within the spout, said external valve body comprising a top end and a bottom end, wherein said external valve body has a plurality of circumferentially located flexible tabs at the top end of said external valve body, wherein said top end engages a dispensing connector;
  (iii) a generally cylindrical internal valve body movable axially within the external valve body, the internal valve body movable between a closed position operable to prevent the flow of fluid through the fitment and an open position operable to allow the flow of fluid through the fitment, the internal valve body movable between closed and open positions by insertion of a dispensing connector into the external valve body adjacent the internal valve body, the internal valve body being biased toward the closed position; and
  (iv) optionally, a cap, said cap comprising an outer skirt and an internal cylinder, wherein said cap in a precap position closes the spout such that the distal end of the outer skirt at its outer surface engages the top rim of the spout and the flexible tabs on the external valve body fit snugly in the space between said outer skirt and said inner cylinder to provide attachment of the cap to said fitment;
  wherein if the dispensing connector is a QCD connector, then said QCD connector engages with the said fitment through said external valve body; and
  wherein if the dispensing connector is a screw-on connector, then said fitment assembly further comprising, optionally, a collar for attachment to the dispensing connector and for releasable coupling to the fitment, wherein when coupled to the fitment the collar compressively engages the external valve body to form a seal between the external valve body and the dispensing connector wherein said collar comprises a generally cylindrical collar body for engagement about said dispensing connector and a fitment end for coupling to said fitment; wherein said collar comprises a compression flange connected to the collar body at said fitment end for engaging and compressing said plurality of flexible tabs located on the top rim of said external valved body at said top end of said external valve body; wherein the fitment end comprises an external descending flange and an internal descending flange connected to said base of said collar body, said external descending flange and said internal descending flange being concentric and spaced from each other; and wherein said fitment assembly is made from a synthetic resin material.

This invention also relates to previously described fitment assembly, wherein said synthetic material is selected from the group consisting of polypropylene, high-density polyethylene, polystyrene, and nylon.

In one embodiment, this invention relates to previously described fitment assembly wherein at least one part of said fitment assembly is made from polypropylene.

In one aspect, in the previously described fitment assembly, said synthetic material is melded.

This invention, in one aspect, further relates to the previously described fitment assemblies, wherein said synthetic material is the same as that for the container.

In yet another aspect, this invention relates to a process for assembling a fitment on to a filled or unfilled container, comprising the following steps:
  (I) assembling a generally cylindrical internal slider valve into a generally cylindrical external valve body to form a valve body assembly into a primary seal position;
  (II) putting a cap on said external valve body of said valve body assembly;
  (III) assembling said assembly of said cap and said valve body assembly on to a generally cylindrical spout in a pre-cap position to form a fitment assembly; and
  (IV) affixing the assembly of Step (III) to said container;
  wherein said fitment assembly comprises said fitment for attachment to said container for holding and dispensing a fluid, wherein said fitment comprises:
    (A) providing said container comprising said fluid, with a fitment attached to said container,
    wherein said fitment is capable of accepting a dispensing connector that is part of a dispensing apparatus, wherein said dispensing connector connects the supply of said fluid to said dispensing apparatus, wherein said dispensing connector is either the QCD connector or the screw-on connector;
    (B) inserting said dispensing connector into said fitment to actuate an internal valve body within said fitment; and (C) dispensing said fluid from said container through said dispensing apparatus; wherein said fitment assembly comprises said fitment attached to said container for holding and dispensing said fluid, said fitment comprising:
  (i) a generally cylindrical spout attached thereto, wherein said spout comprises a base portion attachable to said container and a top portion suitable for receiving a dispensing connector, wherein said spout has sufficient number of threads on the outer surface at the top portion for engagement with a dispensing connector if the dispensing connector is a screw-on connector;
  (ii) a generally cylindrical external valve body movable to a fixed position within the spout, said external valve body comprising a top end and a bottom end, wherein said external valve body has a plurality of circumferentially located flexible tabs at the top end of said external valve body, wherein said top end engages a dispensing connector;
  (iii) a generally cylindrical internal valve body movable axially within the external valve body, the internal valve body movable between a closed position operable to prevent the flow of fluid through the fitment and an open position operable to allow the flow of fluid through the fitment, the internal valve body movable between closed and open positions by insertion of a dispensing connector into the external valve body adjacent the internal valve body, the internal valve body being biased toward the closed position; and
  (iv) optionally, a cap, said cap comprising an outer skirt and an internal cylinder, wherein said cap in a precap position closes the spout such that the distal end of the outer skirt at its outer surface engages the top rim of the spout and the flexible tabs on the external valve body fit snugly in the space between said outer skirt and said inner cylinder to provide attachment of the cap to said fitment;
wherein if the dispensing connector is a QCD connector, then said QCD connector engages with the said fitment through said external valve body; and
wherein if the dispensing connector is a screw-on connector, then said fitment assembly further comprising, optionally, a collar for attachment to the dispensing connector and for releasable coupling to the fitment, wherein when coupled to the fitment the collar compressively engages the external valve body to form a seal between the external valve body and the dispensing connector wherein said collar comprises a generally cylindrical collar body for engagement about said dispensing connector and a fitment end for coupling to said fitment; wherein said collar comprises a compression flange connected to the collar body at said fitment end for engaging and compressing said plurality of flexible tabs located on the top rim of said external valved body at said top end of said external valve body; wherein the fitment end comprises an external descending flange and an internal descending flange connected to said base of said collar body, said external descending flange and said internal descending flange being concentric and spaced from each other; and wherein said fitment assembly is made from a synthetic resin material.

BRIEF DESCRIPTION OF THE DRAWINGS

Embodiments of the present invention will be described with reference to the accompanying drawings, wherein like reference numerals denote like parts, and in which:

FIG. 1 illustrates a cross-sectional side view of a first embodiment of the fitment assembly of the present invention and a dispensing connector in a pre-cap position.

FIG. 2 illustrates a cross-sectional side view of a first embodiment of the fitment assembly of the present invention in an uncap from pre-cap position or ready-to-fill-bag position.

FIG. 3 illustrates a cross-sectional side view of a first embodiment of a fitment assembly of the present invention in a full-cap position.

FIG. 4 illustrates a cross-sectional side view of a first embodiment of a fitment assembly of the present invention and a QCD dispensing connector in a first point of engagement position.

FIG. 5 illustrates a cross-sectional side view of a first embodiment of a fitment assembly of the present invention and a QCD dispensing connector in a first point of fluid flow position.

FIG. 6 illustrates a cross-sectional view of a first embodiment of a fitment assembly and a QCD dispensing connector in a dispense position.

FIG. 7 illustrates a cross-sectional view of a first embodiment of a fitment assembly and a QCD dispensing connector in a disengage and ready-to-re-engage position.

FIG. 8 illustrates a cross-sectional view of a first embodiment of a fitment assembly and a QCD dispensing connector in a dis-engage and a ready-to-re-engage position, wherein the dispensing connector is inserted in the fitment.

FIG. 9 illustrates a cross-sectional side view of a second embodiment of a fitment assembly of the present invention and a dispensing connector in a full-cap position.

FIG. 10 illustrates a cross-sectional side view of a second embodiment of a fitment assembly of the present invention and a dispensing connector in a dispense position.

DETAILED DESCRIPTION OF ILLUSTRATIVE EMBODIMENTS

In a liquid dispensing apparatus such as is used to dispense individual servings of beverages and the like, the syrups, flavorings and other ingredients are frequently supplied in collapsible containers enclosed and shipped within an outer container ("bag-in-box"). The shipping package or container is provided with a fitment that accepts a probe that is part of the dispensing apparatus in order to connect the supply of liquid to the dispensing apparatus. The fitment generally contains a valve that is actuated by the insertion of the probe of the dispensing apparatus in order to allow the liquid to flow into the dispensing apparatus. The fitment attached to the liquid container is generally termed a package connector and the probe or similar device on the dispensing apparatus that interacts with the package connector is generally termed a dispensing connector. Dispensing connectors generally are the quick-connect-disconnect (QCD) type, or the screw-on connector type. The package connector therefore is made compatible to the QCD connector or the screw-on connector.

However, in the present invention, the novel package connector (universal fitment) has the features such that it is compatible with dispensing apparatus that is QCD type, or the screw-on connector type. If a QCD connector is used, a different mechanism is activated, and if a screw-on connector is used, another mechanism is activated for the engaging with the packaging connector to then dispense liquid. Stated another way, this invention relates to liquid dispensing apparatus that functions with either the QCD type of dispensing connector or the screw on connector.

Figure 11B:
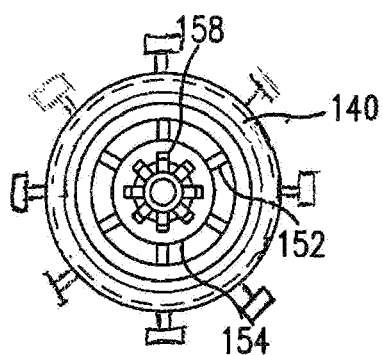
FIG. 11B illustrates a front elevational view of the external valve body of FIG. 11A.
Figure 11A:
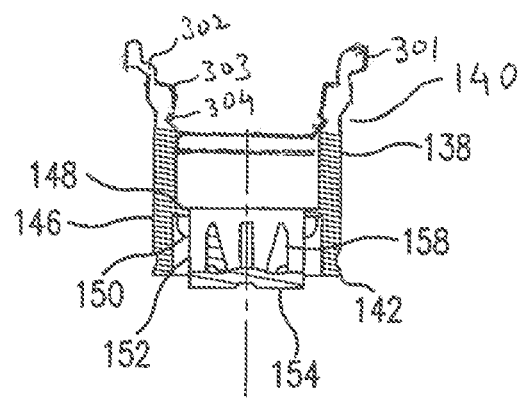
FIG. 11A illustrates a cross-sectional side view of an external valve body used in the fitment assembly of the present invention.
Figure 11C:
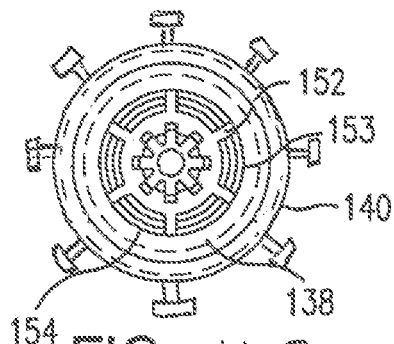
FIG. 11C illustrates a rear elevational view of the external valve body of FIG. 11A.
Figure 11D:
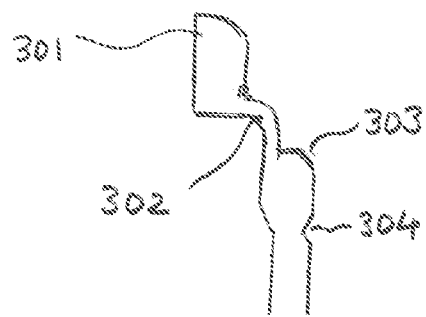
FIG. 11D illustrates an exploded cross-sectional view of the flexible tab at the top rim of the external slider.
Figure 12:
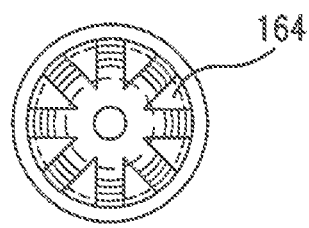
FIG. 12A illustrates a cross-sectional side elevational view of an internal valve body used in the fitment assembly of the present invention.
FIG. 12B illustrates a front elevational view of an internal valve body of FIG. 12A.
FIG. 12C illustrates a rear elevational view of the internal valve body of FIG. 12B.
Figure 12:
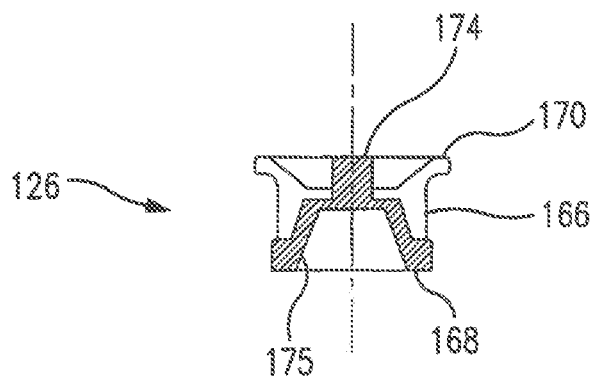
Figure 12:
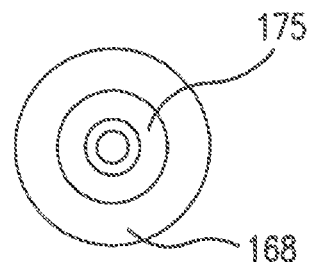
Figure 13:
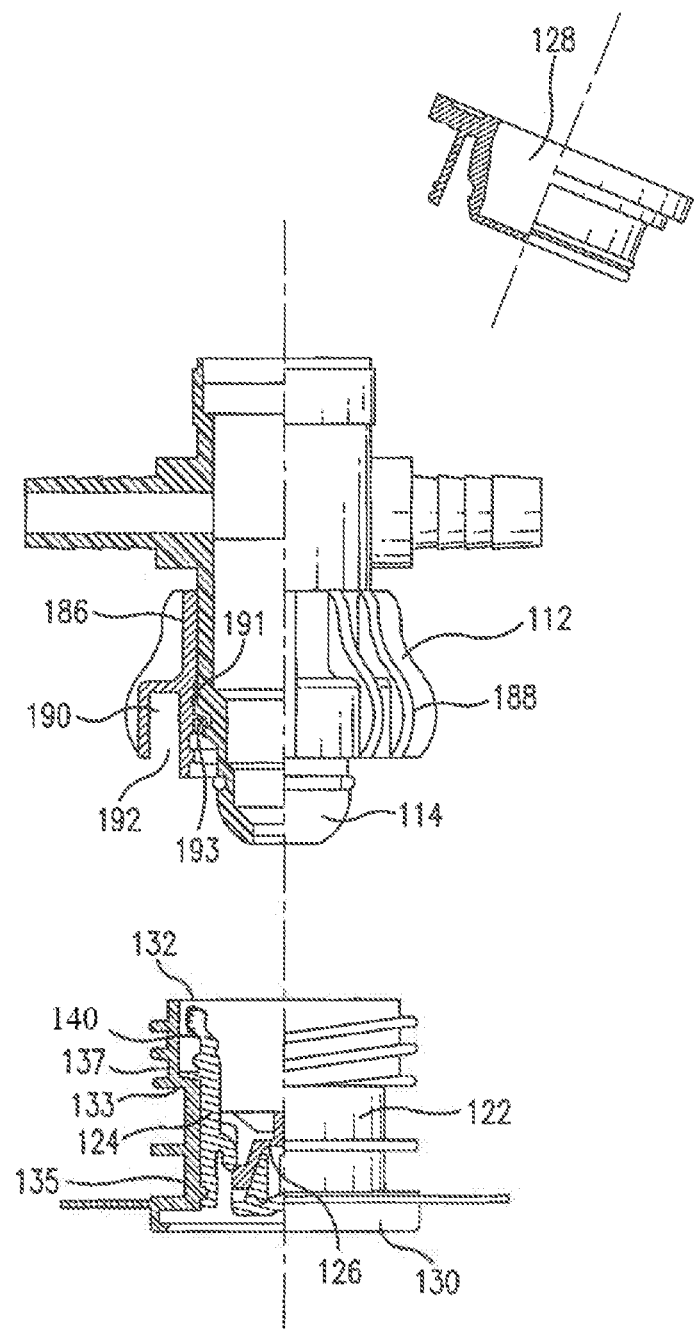
FIG. 13 illustrates a partial cross-sectional side view of one embodiment of a fitment assembly of the present invention and a dispensing connector with a collar in a reseal and disconnect position.
Figure 14:
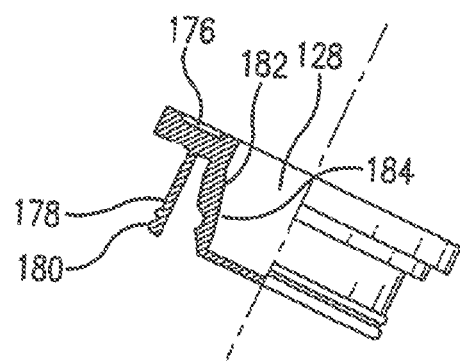
FIG. 14 illustrates a partial cross-sectional side view of the cap of the fitment assembly.

The following description references FIGS. 1-14.

The fitment assembly 110 of the present invention comprises a cap 128, an internal slider 126, an external slider 124, and a spout 122, and optionally a collar 112, for example, in a screw-on connector.

The spout 122 is attached to a container 121 for holding a liquid (not shown). As will be discussed further below, the present invention also includes optionally a collar 112 of the invention for use with other threaded valve bodies securely slidable within container spouts.

The fitment 110 comprises a generally cylindrical spout 122 with a generally cylindrical external valve body 124 movable axially within the spout 122 and an internal valve body 126 movable axially within the external valve body 124. As will be described in further detail below, both the external valve body 124 and the internal valve body 126 are repeatedly slideable to enable opening and closing of the valve. The internal valve body 126 is movable between a closed position that prevents fluid from flowing through the fitment 110 and an open position that allows fluid to flow from the container through the fitment 110. The internal valve body 126 is adapted to be moved between the closed and open positions by insertion of the dispensing connector 114 into the external valve body 124. The internal valve body 126 is sized to be received within the external valve body 124. The fitment 110 suitably further includes a cap 128.

The components of the fitment assembly 110 will now be described in more detail. The spout 122 is generally cylindrical in shape and one end is received by the collar 112 (if a screw-on connector) of the dispensing connector 114 when the assembly is in a dispense position. At the other end of the spout 122 there is a base portion 130 for attaching the spout 122 to a wall of a container 121. Methods and means for attaching the spout 122 to a wall of a container are well known in the art and a variety of attachment mechanisms may be used to secure the spout 122 to a container wall, such as by heat sealing or adhesive attachment or both.

Located at the opposing end of the spout 122 from the base portion 130 is the spout opening 132, which is adapted to receive the dispensing connector 114 therein. The internal surface of the spout 122 suitably includes an integrally melded stop ridge 133 and sealing rings 135, both of which serve to limit the motion of the external valve body 124 at certain stages in the functioning of the fitment assembly 110. Suitable stop ridge 133 and sealing rings 135 are further described in U.S. Pat. No. 6,347,785 (Copp et al.) the disclosures of which are incorporated herein by reference.

The external surface 137 of the spout 122 preferably includes a series of external threads or flanges 306, which are adapted to mate with corresponding threads on a dispensing apparatus 114 or collar 112. The configuration of the external surface 137 of the spout 122 is not particularly restricted and may be altered in accordance with known ways to connect such surfaces e.g. a snap-fit arrangement could also be used. In some embodiment, the external surface of the spout is threaded for threaded engagement with a cooperating threaded collar.

The external valve body 124 is generally cylindrically shaped having an external shell 138 that includes a stop ring 140 at one end (top end) and a positioning ring 142 at the opposing end (base portion or bottom end). When the external valve body 124 is positioned within the spout 122, the positioning ring 142 is located adjacent the base portion 130 of the spout 122, and the stop ring 140 is located adjacent the spout opening 132. Suitably, above stop ring 140, the external surface 138 may be engageable with collar 112 in a screw-on connector, or with the external threads of a QCD connector through the circumferentially placed plurality of flexible tabs 301 at the top of the external valve body 124 and above the stop ring 140. The flexible tabs 301 are attached to the upper rim 303 of the external valve body through a neck 302. A circular groove 304 helps with first point of engagement of a QCD connector so that the O-ring on the QCD connector can rest in the groove to create a nominal seal when the connector is not in the dispense/lock position. In one embodiment the tabs 301 provide engagement with the collar 112 by opposing and flexing to the downward movement of the collar 112 at the internal descending flange 291.

Within the external valve body 124, adjacent the end with the positioning ring 142 is an interior projection 146 that extends around the internal circumference of the shell 138. The projection 146 has an upper surface 148 that faces the end of the shell 138 containing the stop ring 140, and a lower edge 150 that faces the end of the shell 138 containing the positioning ring 142. Suitably, projection or ledge 146 has an inverted "L" shape as shown in the Figures. Extending away from the lower edge 150 towards the end of the shell 138, which includes the stop ring 140, are a series of radially spaced posts 152 defining apertures 153 therebetween. The posts 152 support a valve seat 154 at their lower ends. The posts 152 extend substantially parallel to the shell 138 of the external valve body 124 and are spaced from the shell 138 such that liquid may flow between the shell 138 and the posts 152 and through the space between each post 152. The valve seat 154 is substantially circular and extends between the lower ends of the spaced posts 152.

The valve seat 154 includes a plurality of spaced projections 158 that extend upwardly from the valve seat 154 towards the projection 146. The projections 158 are preferably centrally located on the valve seat 154 and are radially spaced thereon and are operable to be received in the internal valve body 126 as will be described below. It will be understood by a person skilled in the art that the projections 158 may be spaced in any pattern and may form any shape that performs the same function as the projections 158.

Located on the internal valve body 126 are a series of ports 164 that allow the passage of fluid therethrough when the internal valve body 126 is in the open position. When in the open position, the ports 164 are in fluid communication with the apertures 153 between the posts 152 of the external valve body 124.

Suitably, the internal valve body 126 includes a generally cylindrical body 166 with a base ring 168 that extends around one end of the body 166, and a top ring 170 that extends outwardly from and around the opposing end of the body 166 from the base ring 168. A central post 174 extends away from the body 166 at the opposing end to the base ring 168, and is operable to engage the dispensing connector 114, when the fitment 110 is attached to the dispensing connector 114.

The body 166 is sized to be received within the external valve body 124 extending beyond the projection 146 of the external valve body 124 and operable to abut the valve seat 154. The top ring 170 suitably is sized to extend beyond the circumference of the body 166 to rest against and abut the projection 146 when the internal valve body 126 is in the open position. In the open position, the insertion of the dispensing connector 114 moves the internal valve body 126 towards the valve seat 154 and positions the base ring 168 of the body 166 adjacent the valve seat 154. The projections 158 on the valve seat 154 are biased inwardly by the internal walls 175 of the body 166 of the internal valve body 126.

In one embodiment, the internal walls 175 of the body 166 are sloped inwardly to bias the projections 158 inwardly when the plug 126 is located adjacent the valve seat 154. When the dispensing connector 114 is removed, the projections 158 will return to their normally biased position and flex outwardly. When the projections 158 move outwardly, the internal valve body 126 will be forced away from the valve seat 154 and the internal valve body 126 will return to the closed position. Other embodiments may be used that force the projections to bend away from their normal position upon insertion of the dispensing connector 114 into the fitment, provided that when the dispensing connector 114 is removed the projections force the internal valve body 126 away from the valve seat 154 to the closed position. While the projections 158 are biased inwardly and then flex to their initial position, the required inherent resilience is fairly limited and all parts of the fitment 120 may be formed of a fairly rigid material.

Although the fitment assembly 110 of the present invention may be made of any material having suitable properties, preferably, it is made of a synthetic resin material that can be melded to form its parts. The synthetic resin material must have sufficient resiliency so that the projections 158 will return to their rest position when a deforming pressure is released. If the fitment assembly 110 is made from a single synthetic resin material, recycling of the valve is made particularly easy, because the used valve can be ground up, remelted and remolded into new valves. It is preferred that the fitment assembly 110 be made from a synthetic resin that is the same as that used to form the liquid-containing bag with which the fitment is used. Such compatibility further increases the ease of recycling the valve. A preferred synthetic resin for the valve is polypropylene. The valve can also be made of high-density polyethylene, polystyrene, nylon or the like.

When the internal valve body 126 returns to the closed position, it may return to either its initial position or to one in which the top ring 170 is lower than in the initial position, i.e. closer to the ledge 146, provided that there is a seal between the internal valve body 126 and the external valve body 124, and no fluid can pass through the fitment 110. The closed position referred to includes all such positions in which the internal valve body 126 is moved away from the valve seat 154 and where no fluid can pass through the fitment 110.

It will be understood by a person skilled in the art in light of the above description that the external valve body 124 is operable to move along the inside of the spout 122 in a smooth telescoping movement while maintaining continuous contact with the spout 122. Likewise, the internal valve body 126 is operable to move along the inside of the external valve body 124 in a smooth telescoping movement. Further, the internal valve body 126 acts like a plug within the external valve body 124 and is seated within the external valve body 124 in the open position to allow fluid to pass through and is unseated in the closed position to prevent fluid from passing through.

The fitment assembly 110 further includes a cap 128. The cap 128 may include a cover 176 and a skirt 178 bearing an outer retaining ring 180 and an internal cylinder 182 bearing an inner retaining ring 184 which engages the cap 128 with the external valve body 124, and particularly the flexible tabs 301 of the external valve body, when the cap 128, external valve body 124, and internal valve body 126 are removed as a unit in order to fill the container (for example, in the precap position). In this position, the flexible tabs are snug in between the skirt 178 and the internal cylinder 182. Suitably, the cap 128 is sized so that the skirt 178 is received within the spout 122. As a result, the outer skirt 178 of the cap 128 is designed to not attach to the outer surface 137 of the spout 122. This allows for threads on the outer surface of the spout 122 to engage with a screw-on connector if the dispensing apparatus 114 is a screw on connector. This allows for a same diameter threads for example, and sufficient numbers of pitches for engaging the dispensing apparatus 114.

The inventor of the present invention has surprisingly discovered that in one embodiment, for a screw-on connector comprising a collar 112 that engages the external valve body 124 in a compressive fashion can provide improved sealing and reduced seal failure and otherwise improve the sliding operation of the valve components.

The collar 112 of the fitment assembly 110 of the present invention comprises a generally cylindrical collar body 186 for engagement about the dispensing connector 114. The collar body 186 includes a fitment end 188 for engaging the fitment. The fitment end 188 includes an external descending flange 190 and an internal descending flange 191 connected to the collar body 186. The external descending flange 190 and internal descending flange 191 are concentrically arranged and form therebetween a receiving space 192.

FIG. 1 illustrates a cross-sectional view of the universal double slider valve fitment 110 in a pre-cap position. In this position, the double slider valves (126 and 124) and the cap 128 are removably positioned within the spout 122, in order to be readily removable for filling of the container directly through an open spout 122. As shown in FIG. 1, the cap 128 locks in with the external valve 124 such that its outer skirt 178 at its distal end 308 fits with the inner surface ring 309 of the spout 122, at the top near the spout opening 132. In this pre-cap position, the cap 128 is attached to the fitment by means of the plurality of the flexible tabs 301. In this position, the valve seat 154 is still not flush with the base 130 of the spout and the dispensing connector (not shown) is clearly not engaged with the fitment 110.

FIG. 2 illustrates a cross-sectional view of the "uncap from pre-cap" position or the fill position, which is when the bag-in-box is to be filled through the spout 122. The slider valve assembly and the cap (124, 126, and a128) are detached from the spout to enable filling of the bag (not shown) that is attached to the spout 122.

FIG. 3 illustrates a cross-sectional side view of the double slider valve fitment 110 in a full-cap position. This position is suitable for a filled container ready for delivery to the end-user. In this position, the positioning ring 142 of the external valve body 124 is engaged with the interior of the spout 122, and the stop ring 140 and the flexible tabs 301 are engaged with the skirt 178 of the cap 128 so that the double slider valve fitment 110 is securely positioned within the spout 122. The cap 128 is secured to the fitment 110.

FIG. 4 illustrates a cross sectional view of the first point of engagement of a QCD type of connector 114 engaged with the external slider 124. While the fitment 110 is in a full cap position, the dispensing connector probe has not engaged the central post 174 of the internal slider yet, that is, the fitment 110 is still in the closed position.

FIG. 5 illustrates a cross-sectional view of the first point of fluid flow, wherein the external slider 124 moves down into the dispense lock position. Stated another way, the dispensing connector 114 is fully locked into the external slider 124 and the internal slider 126 (wherein the probe of the dispensing connector 114 now pushes down on the central post 174). But this is not yet the dispense position. In this position the first fluid flow occurs. The external slider 124 is yet to move downward into a dispense position.

FIG. 6 illustrates a cross-sectional view of the double slider valve fitment 110 in a dispense position with the dispensing connector 114 fully locked in with the external and internal sliders 124 & 126, and the external slider 124 that can move telescopically within the spout 122 is now pushed into a full dispense position, all the way down past the base 132 of the spout 122. The external slider 124 is now locked in with the spout 122 as a result of the flexible tabs 301 and the ring 140 adjacent to it pushing down on the integrally melded stop ridge 133 and sealing rings 135, both of which serve to limit the motion of the external valve body 124.

As the dispensing connector 114 is engaged with the external valve body 124, an inward force on the internal valve body 126 is applied and the internal valve body 126 is moved axially within the external valve body 124 towards the valve seat 154. The top ring 170 of the internal valve body 126 rests adjacent the upper surface 148 of the ledge 146, preventing further axial movement of the internal valve body 126 towards the valve seat 154. It will be understood by a person skilled in the art that further axial movement of the internal valve body 126 may be prevented by either the top ring 170 abutting the ledge 146 or the position of the valve seat 154 adjacent the internal valve body 126 or by both. The base ring 168 rests against the valve seat 154 and the projections 158 on the valve seat 154 are biased inwardly by the internal walls 175 of the body 166 of the internal valve body 126. In this position, the ports 164 of the internal valve body 126 are in fluid communication with the apertures 153 located between the posts 152 on the external valve body 124, and fluid can flow from the container between the shell 138 and the valve seat 154 through the apertures 153 between the posts 152 and through the ports 164 on the internal valve body 126, into the dispensing connector 114.

Once the dispensing connector 114 is removed, the pressure on the internal valve body 126 is released and projections 158 will move to their normal position and push outwardly against the internal walls 175 of the body 166, which will push the internal valve body 126 up and away from the valve seat 154 towards the closed position.

FIG. 7 illustrates a cross-sectional side view of the double slider fitment 110 of the present invention and a dispensing connector 114 in a disengage and ready-to-re-engage position. As shown, the dispensing connector 114 is removed and the valve moves to a closed position of the fitment 110. The internal valve body 126 is received in the external valve body 124 with the top ring 170 spaced from the upper surface 148 of the ledge 146. The base ring 168 of the internal valve body 126 abuts against the upper ends of the posts 152 of the external valve body 124 and blocks any flow of fluid through the apertures 153 located between the posts 152. The closed position prevents any fluid from passing through the fitment 110 into the dispensing connector 114.

FIG. 8 illustrates a cross-sectional side view of the double slider valve fitment 110 in a disengaged but ready-to-engage position. Here the flexible tabs 301 of the external slider 124 are in a locked position with the stop ridge 133 of the spout 122.

A second embodiment of the invention will now be described with reference to FIGS. 9 and 10. In these figures, parts are numbered in the two-hundreds and like parts are numbered with like reference numerals in the second and third position.

Generally, the second embodiment works according to the same mechanism of the first embodiment described above, except as described below. In this embodiment, the fitment end 288 of collar body 286 is mateable with the fitment 210. The fitment end 288 comprises an external descending flange 290 and an internal descending flange 291 connected to the periphery of the collar body 286 to form a receiving space 292 which may receive a portion of spout 222. The internal surface of this descending flange 290 is threaded for threadably engaging the external surface of spout 222. In operation, as the dispensing connector 214 moves the valve to an open position, the collar 212 engages with external valve body 224 to provide an additional point of sealing. As the collar 212 is threaded onto the spout 222, it pulls the dispensing connector 214 down into the external valve body 224 where the nose of the dispensing connector 214 come into contact with the internal valve body 226. The threading then moves the internal valve body 226 down into the dispensing position where a first seal A and second seal B associated with an O-ring on dispensing connector 214 are made during this action.

As the collar 212 starts to reach the end of its stroke, the compression flange 293 on the collar 212 comes into contact with the top of the external valve body 224. The compression flange 293 then goes into the inside of the top edge of external valve body 224 as the outside wedge angle 294 on the collar 212 starts to wedge against the lock 295 on the external valve body 224, thereby compressing the top of the external valve body 224 against the dispensing connector 214 to form a third seal C between the external valve body 224 and the dispensing connector 214. Accordingly, the tighter the collar 212 is turned, the tighter the third seal C becomes.

Compressions flanges, 193 and 293 furnish a further advantage to the fitment assembly of the present invention. As previously mentioned, known fitments have a tendency for the collar and probe to become inadvertently disengaged. In the present invention compression flanges 193 and 293 suitably "locks" into a groove typical of probes common in the field, thereby reducing the likelihood of inadvertent collar and probe separation. As will be apparent with reference in particular to FIGS. 9 and 10 as the ledge of the probe pushes upward on compression flange 193 or 293, the compression flange is further secured within the groove thereby further securing the two components together.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description.

All publications, patents and patent application referred to herein are incorporated by reference in their entirety to the same extent as if each individual publication, patent or patent application was specifically and individually indicated to be incorporated by reference in its entirety.

What is claimed:

1. A process for dispensing fluid to or from a container using a dispensing connector that is either a QCD connector or a screw-on connector, said process comprising:
    (I) providing said container comprising said fluid, with a fitment attached to said container, wherein said fitment is capable of accepting a dispensing connector that is part of a dispensing apparatus, wherein said dispensing connector connects the supply of said fluid to said dispensing apparatus, wherein said dispensing connector is either the QCD connector or the screw-on connector;
    (II) inserting said dispensing connector into said fitment to actuate an internal valve body within said fitment; and
    (III) dispensing said fluid from said container through said dispensing apparatus; wherein said fitment assembly comprises said fitment attached to said container for holding and dispensing said fluid, said fitment comprising:
        (i) a generally cylindrical spout attached thereto and defining an outer surface and an inner surface opposite the outer surface, wherein said spout comprises a base portion attachable to said container and a top portion suitable for receiving a dispensing connector, wherein said spout has a thread on the outer surface at the top portion for engagement with a dispensing connector;
        (ii) a generally cylindrical external valve body movable to a fixed position within the spout, said external valve body comprising a top end and a bottom end, wherein said external valve body has a plurality of circumferentially located flexible tabs at the top end of said external valve body, wherein said top end engages the dispensing connector;
        (iii) a generally cylindrical internal valve body movable axially within the external valve body, the internal valve body movable between a closed position operable to prevent the flow of fluid through the fitment and an open position operable to allow the flow of fluid through the fitment, the internal valve body movable between closed and open positions by insertion of the dispensing connector into the external valve body adjacent the internal valve body, the internal valve body being biased toward the closed position; and
        (iv) a cap comprising an outer skirt, which defines a distal end, and an internal cylinder, wherein said cap in a precap position closes the spout such that the distal end of the outer skirt at its outer surface engages the top portion of the spout at the inner surface of the spout such that the outer skirt is between the spout and the external valve body, and the flexible tabs on the external valve body fit snugly in a space defined between said outer skirt and said internal cylinder to provide attachment of the cap to said fitment;
    wherein said fitment assembly is made from a synthetic resin material.

2. The process as recited in claim 1, wherein the dispensing connector is a screw-on connector and said internal wall of the external descending flange is threaded for engagement with an external threaded surface of said spout.

3. The process as recited in claim 1, wherein the dispensing connector is a screw-on connector and the external descending flange and internal descending flange are spaced from each other so as to form a receiving space and a portion of the spout is receivable in the receiving space without active engagement of the exterior of the spout.

4. The process as recited in claim 3, wherein the receiving space has smooth walls.

5. The process as recited in claim 1, wherein the dispensing connector is a screw-on connector, and wherein the external descending flange extends about the entire periphery of the collar body.

6. The process as recited in claim 1, wherein the compression flange is connected to an internal surface of the internal descending flange for engaging and compressing the flexible tabs at the top rim of the external slider.

7. The process as recited in claim 1, wherein the external valve body comprises a generally cylindrical body and a valve seat attached to an end thereof by a plurality of radially spaced posts defining apertures therebetween, the posts being spaced from the spout to allow liquid to flow therethrough when the valve is in the open position.

8. The process as recited in claim 7, wherein the internal valve body comprises a body having a plurality of ports therein that allow fluid flow therethrough when the valve is in the open position.

9. The process as recited in claim 8, wherein the valve seat further comprises a plurality of spaced projections that extend from the valve seat toward the exterior of the container.

10. The process as recited in claim 9, wherein in the open position, the dispensing connector compresses the internal valve body such that the internal valve body forces the projections to assume a biased position, the projections returning the internal valve body to a closed position when the dispensing connector is removed.

11. The process as recited in claim 1, wherein said dispensing connector is a screw-on connector with a collar and wherein said dispensing connector collar comprising a collar body for engagement about said dispensing connector, said dispensing connector collar body having a fitment end mateable with said fitment so as to compress said top of the external valve body against said dispensing connector to form a seal; wherein said collar comprises a generally cylindrical collar body for engagement about said dispensing connector and a fitment end for coupling to said fitment; wherein said collar comprises a compression flange connected to the collar body at said fitment end for engaging and compressing a top edge of said external valve body; and wherein the fitment end comprises an external descending flange and an internal descending flange connected to said base of said collar body, said external descending flange and said internal descending flange being concentric and spaced from each other.

12. The process as recited in claim 1, wherein said dispensing connector is a screw-on connector, with a connector collar and wherein said connector collar engages a valved fitment for a container for holding and dispensing fluid; wherein said collar body having a fitment end mateable with the fitment so as to compress the plurality of flexible tabs located on the top rim of the external slider valve so as to form a seal between the external slider valve and the dispensing connector; wherein the compression flange engages the flexible tabs at the top rim of the external slider valve wherein compression in a downward direction causes a seal between the inner edge of the slideable component and an inner lip of the compression flange; wherein the compression flange engages the top rim of the spout wherein compression in a downward direction causes a seal between the inner edge of the spout and an inner lip of the compression flange; wherein said fitment-attached to said container for holding and dispensing said fluid and having a generally cylindrical spout attached thereto, said fitment comprising a generally cylindrical external valve body movable to a fixed position within said spout; and a generally cylindrical said internal valve body movable axially within said external valve body, said internal valve body movable between a closed position operable to prevent the flow of said fluid through said fitment and an open position operable to allow the flow of said fluid through said fitment, said internal valve body movable between closed and open positions by insertion of said dispensing connector into said external valve body adjacent said internal valve body, said internal valve body being biased toward said closed position; and a collar for attachment to said dispensing connector and for releasable coupling to said fitment, wherein when coupled to said fitment said collar compressively engages said external valve body to form a seal between said external valve body and said dispensing connector; wherein said collar comprises a generally cylindrical collar body for engagement about said dispensing connector and a fitment end for coupling to said fitment; wherein said collar comprises a compression flange connected to the collar body at said fitment end for engaging and compressing the flexible tabs of said external valve body; wherein the fitment end comprises an external descending flange and an internal descending flange connected to said base of said collar body, said external descending flange and said internal descending flange being concentric and spaced from each other; and wherein said fitment is made from a synthetic resin material.

13. The process as recited in claim 1, wherein the dispensing connector is a QCD connector, and said QCD connector is configured to engage with the fitment through said external valve body.

14. The process as recited in claim 1, wherein the dispensing connector is a screw-on connector, and said fitment assembly further includes a collar for attachment to the dispensing connector and for releasable coupling to the fitment, wherein when coupled to the fitment, the collar compressively engages the external valve body to form a seal between the external valve body and the dispensing connector,
wherein said collar comprises a generally cylindrical collar body for engagement about said dispensing connector and a fitment end for coupling to said fitment;
wherein said collar comprises a compression flange connected to the collar body at said fitment end for engaging and compressing said plurality of flexible tabs located on the top portion of said external valve body at said top end of said external valve body.

15. A process for assembling a fitment on to a filled or unfilled container, comprising the following steps:

(I) assembling a generally cylindrical internal slider valve into a generally cylindrical external valve body to form a valve body assembly into a primary seal position;
(II) putting a cap on said external valve body of said valve body assembly;
(III) assembling said assembly of said cap and said valve body assembly on to a generally cylindrical spout in a pre-cap position to form a fitment assembly, the spout defining an outer surface and an inner surface opposite the outer surface; and
(IV) affixing the assembly of Step (III) to said container; wherein said fitment assembly comprises said fitment for attachment to said container for holding and dispensing a fluid, wherein said fitment comprises:
(A) providing said container comprising said fluid, with a fitment attached to said container,
wherein said fitment is capable of accepting a dispensing connector that is part of a dispensing apparatus, wherein said dispensing connector connects the supply of said fluid to said dispensing apparatus, wherein said dispensing connector is either the QCD connector or the screw-on connector;
(B) inserting said dispensing connector into said fitment to actuate an internal valve body within said fitment; and
(C) dispensing said fluid from said container through said dispensing apparatus; wherein said fitment assembly comprises said fitment attached to said container for holding and dispensing said fluid, said fitment comprising:
(i) a generally cylindrical spout attached thereto, wherein said spout comprises a base portion attachable to said container and a top portion suitable for receiving a dispensing connector, wherein said spout has a thread on the outer surface at the top portion for engagement with the dispensing connector;
(ii) a generally cylindrical external valve body movable to a fixed position within the spout, said external valve body comprising a top end and a bottom end, wherein said external valve body has a plurality of circumferentially located flexible tabs at the top end of said external valve body, wherein said top end engages the dispensing connector;
(iii) a generally cylindrical internal valve body movable axially within the external valve body, the internal valve body movable between a closed position operable to prevent the flow of fluid through the fitment and an open position operable to allow the flow of fluid through the fitment, the internal valve body movable between closed and open positions by insertion of the dispensing connector into the external valve body adjacent the internal valve body, the internal valve body being biased toward the closed position; and
(iv) a cap comprising an outer skirt, which defines a distal end, and an internal cylinder, wherein said cap in a precap position closes the spout such that the distal end of the outer skirt at its outer surface engages the top portion of the spout at the inner surface of the spout such that the outer skirt is between the spout and the external valve body, and the flexible tabs on the external valve body fit snugly in a space defined between said outer skirt and said internal cylinder to provide attachment of the cap to said fitment;

wherein said fitment assembly is made from a synthetic resin material.

16. The process as recited in claim 15, wherein the dispensing connector is a QCD connector, and said QCD connector is configured to engage with the fitment through said external valve body.

17. The process as recited in claim 15, wherein the dispensing connector is a screw-on connector, and said fitment assembly further includes a collar for attachment to the dispensing connector and for releasable coupling to the fitment, wherein when coupled to the fitment, the collar compressively engages the external valve body to form a seal between the external valve body and the dispensing connector, wherein said collar comprises a generally cylindrical collar body for engagement about said dispensing connector and a fitment end for coupling to said fitment;

wherein said collar comprises a compression flange connected to the collar body at said fitment end for engaging and compressing said plurality of flexible tabs located on the top portion of said external valve body at said top end of said external valve body.

* * * * *